March 30, 1943.  E. A. POPE  2,314,950
PLUMBING FIXTURE
Filed Jan. 9, 1941  2 Sheets-Sheet 1
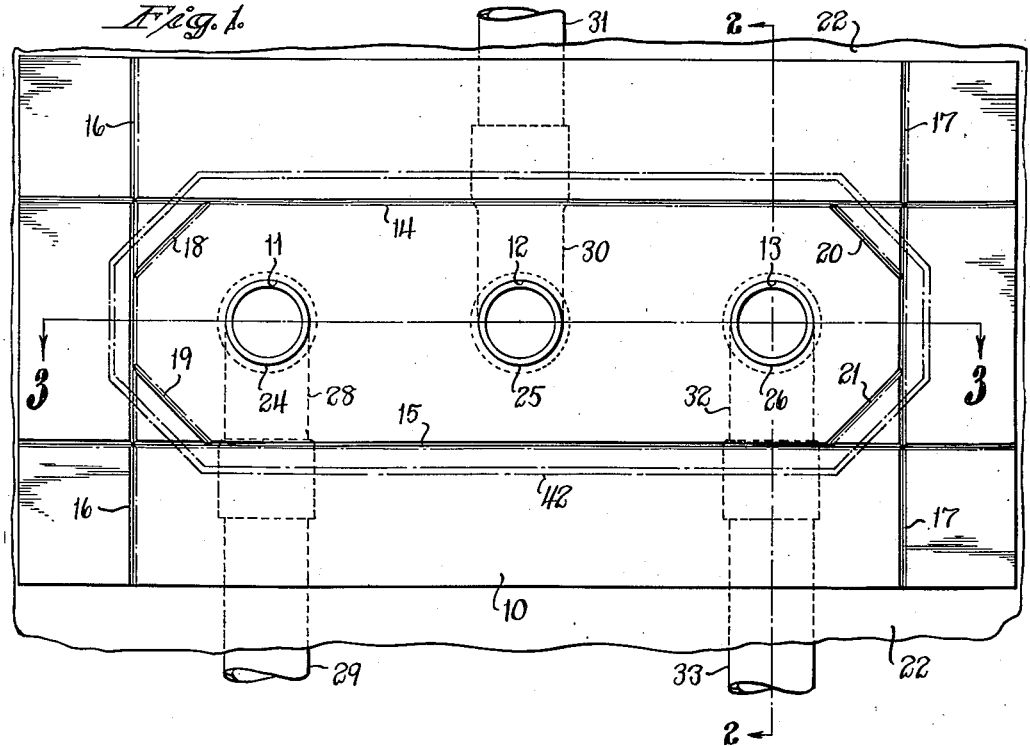
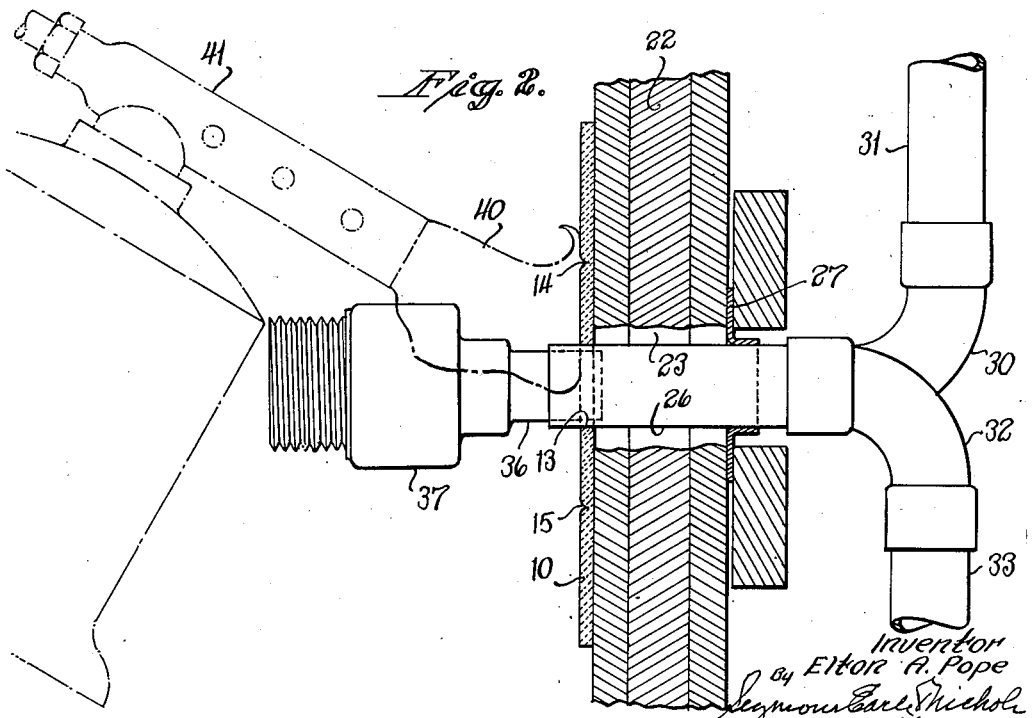
Inventor
Elton A. Pope
Seymour Earl Nichol
Attorneys March 30, 1943.  E. A. POPE  2,314,950
PLUMBING FIXTURE
Filed Jan. 9, 1941  2 Sheets—Sheet 2
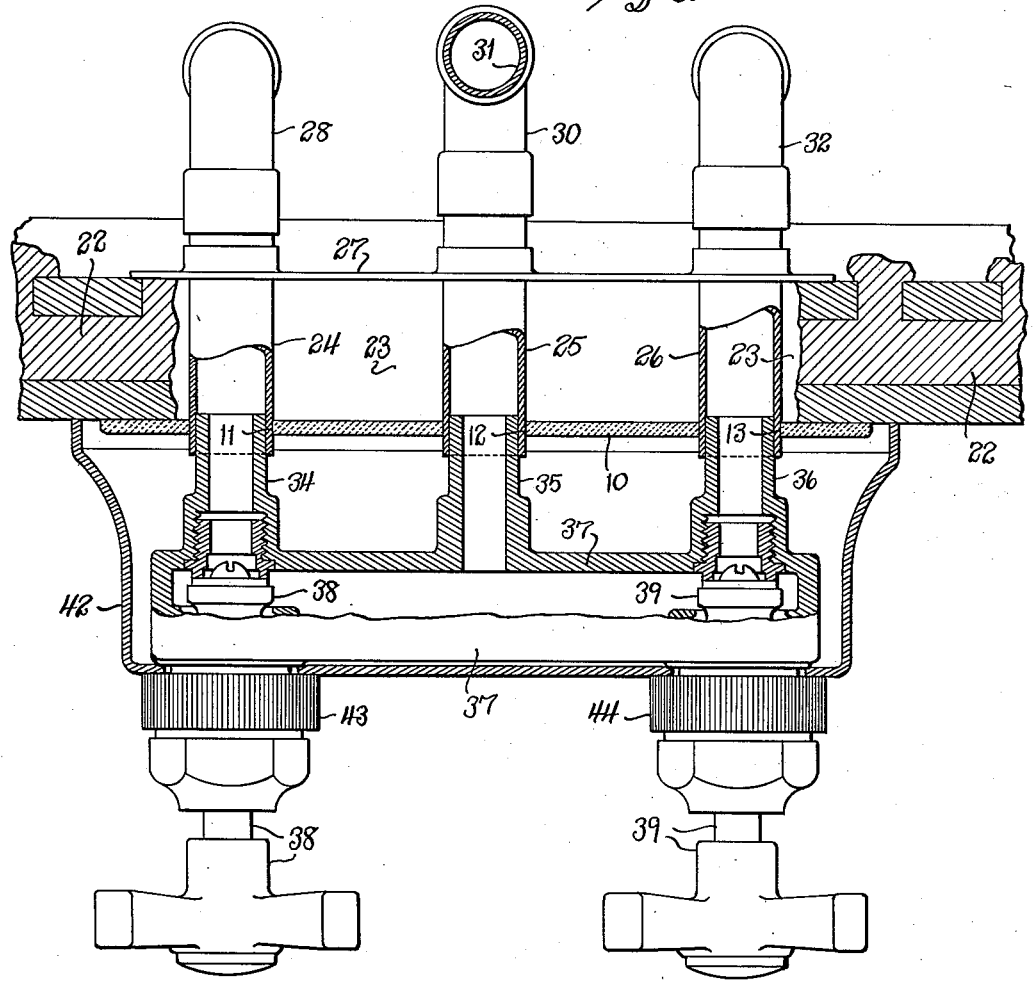
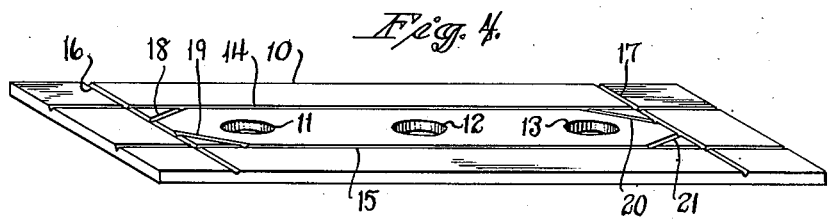
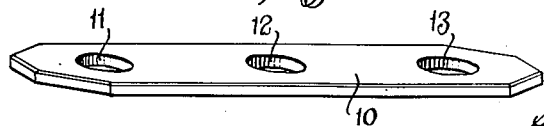
Inventor
Elton A. Pope
By Seymour Earl Nichols
Attorneys Patented Mar. 30, 1943

2,314,950

UNITED STATES PATENT OFFICE 2,314,950

PLUMBING FIXTURE

Elton A. Pope, Waterbury, Conn., assignor to Chase Brass & Copper Co. Incorporated, Waterbury, Conn., a corporation Application January 9, 1941, Serial No. 373,771

1 Claim. (Cl. 113—111)

The present invention relates to improvements in plumbing fixtures and more particularly to fixtures for locating a plurality of pipes or the like with respect to each other to thus facilitate the connection thereto, by solder or the like, of plural-valve plumbing fittings or other fixtures.

One of the objects of the present invention is to provide a superior plumbing fixture comprising a template which may be of ample area to effectively act as a shield against heat applied to effect soldering and at the same time be capable of convenient later reduction in area to enable it to be concealed by a relatively-small-sized escutcheon or the like.

Another object of the present invention is to provide a superior template which in addition to functioning as positioning-and-locating means will have such characteristics as to readily bond with plaster or the like commonly employed in wall structures.

A further object of the present invention is to provide a superior and improved template for installation in the wall of a building, which template may so snugly fit pipe-terminals or the like, as to preclude the transit of vermin and at the same time be sufficiently yielding as to facilitate the extension of pipe-terminals or the like through the apertures of the template.

Still another object of the present invention is to provide a superior template which may be broken conveniently after it has served its purpose, to thereby permit its removal from a wall structure without damage thereto.

A further object is to provide a superior template of the character referred to, which will effectively serve to hold pipe-terminals or the like in spaced relationship for soldering to valve structures or the like and at the same time serve to minimize the loss of heat from the solder joint during the operation of soldering.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a broken face view of a fragment of a wall structure showing the improved template of the present invention associated therewith and serving to locate three pipe-terminals with respect to each other;

Fig. 2 is a broken transverse sectional view taken on the line 2—2 of Fig. 1 and showing the template serving as a flame-guard during the operation of soldering a distributing-head to the pipe-terminals;

Fig. 3 is a broken horizontal sectional view taken on the line 3—3 of Fig. 1 and showing in addition a plural-valve plumbing fixture and an escutcheon or covering-plate;

Fig. 4 is a perspective view of the template detached prior to being reduced in size; and Fig. 5 is a perspective view of the template detached after the outer portions thereof have been broken away.

As is especially well shown in Fig. 4, a template or combined locating-member and flame-guard 10 is provided centrally along its major axis with three (more or less) pipe-passages 11, 12 and 13 extending from front to rear through the template. The template 10 in its initial state is preferably of rectangular form as shown, and on each of the respective opposite sides of its pipe-passages 11, 12 and 13, it is provided with one of two longitudinal scorings or incisions 14 and 15 extending from end to end of the template as shown.

The combined template and flame-guard 10 is formed, in the main, of non-metallic, flame-resisting and heat-insulating material such as asbestos board or other board formed essentially of flame-resisting material such as mineral wool, spun glass, etc., together with a suitable binder (starch, casein or the like) which will serve to hold the fibers together and at the same time sufficiently stiffen the structure as to render it readily handleable and preferably also moderately brittle or friable. The template 10 as thus produced should also possess a degree of yieldability especially in the areas surrounding the pipe-passages 11, 12 and 13 or their equivalent.

In addition to the longitudinal incisions 14 and 15 before referred to, the template 10 is also formed adjacent each of its opposite ends with one of two transversely-extending incisions or scorings 16 and 17 extending from edge to edge as shown, and intersecting the longitudinal incisions 14 and 15.

Within the area defined by the longitudinal incisions 14 and 15 and the transverse incisions 16 and 17, the template 10 is provided adjacent the transverse incision 16 with two oppositely-sloping diagonal incisions or scorings 18 and 19 which respectively intersect the incisions 14—16 and 15—16. Similarly and at its opposite end, the template is formed with two oppositely-sloping diagonal incisions 20 and 21 respectively intersecting the incisions 14—17 and 15—17.

For the purpose of illustrating one mode of utilizing the present invention, the template 10 is shown in conjunction with a wall structure 22 having an opening 23 leading from front to rear therethrough for the accommodation of three (more or less) horizontal pipe-terminals which, in the instance shown, are formed of copper or other readily solderable material and respectively constituting a hot-water inlet-pipe 24, a mixed-water outlet-pipe 25 and a cold-water inlet-pipe 26.

At its rear, the hot-water inlet-pipe 24 preferably extends through a metallic template 27 and has soldered or otherwise secured to its projecting rear end, a downwardly-curving hot-water elbow 28. Connected in turn to the lower end of the elbow 28 is a vertical hot-water supply-pipe 29 leading upwardly from a suitable source of hot water.

The mixed-water outlet-pipe or tube 25 has its rear portion projected through the metallic template 27 and connected at the rear of the said template with the lower end of an upwardly-curving mixed-water elbow 30. The upper end of the elbow 30 has connected to it the lower end of a vertical mixed-water outlet-pipe or tube 31 which may lead upwardly to a shower-head or the like (not shown).

In a similar manner, the rear portion of the cold-water inlet-pipe 26 is projected rearwardly through the metallic template 27 and is there connected to the upper end of a downwardly-curving cold-water elbow 32. As is shown particularly well in Fig. 1, the lower end of the elbow 32 is connected to the upper end of a vertical cold-water supply-pipe 33 leading from a suitable source of cold water.

The template 10 is preferably placed against the front face of the wall structure 22 with its pipe-passages 11, 12 and 13 respectively sleeved over the pipe-terminals 24, 25 and 26 with a snug sliding fit. The said template 10 may be placed in position against the front face of the wall structure 22 while the plaster is still wet or if desired the plaster may be applied after the same has been placed in position, but in any event the fibrous nature of the said template will form a natural bond with the plaster when such bond is required. The template 10 as thus positioned with the forward portions of the pipe-terminals 24, 25 and 26 respectively projecting through its pipe-passages 11, 12 and 13 will serve to accurately position the said pipe-terminals so that, if desired, coupling-terminals 34, 35 and 36 of a distributing-head 37 may be respectively telescoped into the said terminals, as is especially well shown in Fig. 3. Preferably, the coupling-terminals just referred to are each provided with a smooth cylindrically-contoured exterior surface fitting within the respective pipe-terminals in such manner as to provide a convenient capillary space for the reception of solder or the like.

The coupling-terminals 34, 35 and 36 are in the instance shown, formed integral with and rearwardly project from the hollow distributing-head 37, which may be conveniently formed of cast brass or the like. The said distributing-head is provided in line with the pipe-terminal 24 with a valve-structure 38 for controlling the flow of hot water from the said pipe-terminal 24 into the hollow interior of the distributing-head for flow outwardly therefrom through the mixed-water outlet-pipe 25. In line with the cold-water pipe-terminal 26, the distributing-head 37 is provided with a valve-structure 39 designed and adapted to control the flow of cold water from the said pipe-terminal into the hollow interior of the distributing-head for flow outwardly therefrom through the mixed-water outlet-pipe 25 and the parts connected thereto.

Preferably and as indicated in Fig. 2, the distributing-head 37 will have its coupling-terminals 34, 35 and 36 respectively entered into the pipe-terminals 24, 25 and 26 prior to the installation to the said distributing-head of the valve-structures 38 and 39.

With the parts in the relationships shown particularly well in Fig. 2, a flame such as 40 may be directed from a blowtorch 41 against the telescoped portions of the said distributing-head 37 and the pipe-terminals 24, 25 and 26 until the said parts are raised to a temperature sufficient to melt solder, whereupon solder may be applied to the joint and in this case will flow by capillary action between the telescoped parts, and when cold will firmly interconnect the same. During the operation just described, the template 10, which is also a flame-guard, will not only shield the adjacent wall-structure from the damaging effects of the flame 40, but will also and by virtue of its heat-insulating characteristic, minimize the escape of heat from the telescoped joints to thus facilitate their being raised to the proper sweat-solderable temperature. Furthermore, by reason of the snug and somewhat elastic fit between the walls of the pipe-passages 11, 12 and 13 and their respective pipe-terminals 24, 25 and 26, the flames will be prevented from penetrating through the said pipe-passages.

After the sweat-soldering has been accomplished as above described, and should it be desired to employ a relatively-small-sized escutcheon or covering-plate such as 42 shown in Fig. 3, the outer portions of the template 10 may be conveniently broken away along the incisions 14 to 21 inclusive until its perimeter assumes the shape and proportion shown in Fig. 5.

The escutcheon or cover-plate 42 or its equivalent may be conveniently retained in place by retaining-nuts 43 and 44 respectively threaded onto the forward portions of the valve-structures 38 and 39, as indicated in Fig. 3.

Under some conditions, it might be desirable to entirely remove the template 10 after the completion of the soldering operations above referred to. In such a case, the said template may be conveniently broken into fragments to permit its complete removal from the wall. Such breakage of the template 10, however, may, owing to the novel character of the said template, be accomplished without damage or strain upon either the wall-structure or the various pipe-fittings and fixtures.

By means of the snug fit which it is possible to conveniently achieve between the walls of the apertures in the template and the pipes or other fittings which they receive, not only are flames prevented from passing rearwardly into the wall-structure but vermin are definitely precluded from transit through the wall.

From the foregoing it will be seen that by means of the present invention soldering operations may be carried on close to the wall-surface without injury thereto and with such a minimum of heat being conducted away as to not interfere with rapid soldering.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

I claim:

A one-piece combined plumbing template and flame-guard of plate-like form designed and adapted to be mounted against a wall structure of a building to hold a plurality of solderable pipe-terminals in definite predetermined spaced relationship, the said combined template and flame-guard being provided with a plurality of apertures to each receive and hold a solderable pipe-terminal, the said plate-like combined template and flame-guard being formed of friable non-metallic material sufficiently inelastic to definitely space the said pipe-terminals and combining flame-resisting and heat-insulating properties, the said template and flame-guard being provided with a plurality of lines of relative weakness spaced inwardly from the edge of the template to divide parts thereof from other parts and extending around the plurality of apertures therein to permit parts of the template to be broken off without damage to the remainder of the template; whereby the said combined template and flame-guard may be reduced in size to fit within an escutcheon after having discharged its function of acting as a flame-guard during the soldering of the pipe-terminals to a plumbing fixture.

ELTON A. POPE.